(12) United States Patent
Tu et al.

(10) Patent No.: US 11,163,589 B2
(45) Date of Patent: Nov. 2, 2021

(54) CLASS UNLOADING METHOD AND ELECTRONIC DEVICE

(71) Applicant: Huawei Technologies Co., Ltd., Shenzhen (CN)

(72) Inventors: Xiaobing Tu, Shenzhen (CN); Hao Chen, Nanjing (CN); Bifeng Tong, Nanjing (CN); Fei Wang, Wuhan (CN); Yinglu Lin, Shenzhen (CN); Xiaoxiao Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/754,701

(22) PCT Filed: Oct. 13, 2017

(86) PCT No.: PCT/CN2017/106154
§ 371 (c)(1),
(2) Date: Apr. 8, 2020

(87) PCT Pub. No.: WO2019/071601
PCT Pub. Date: Apr. 18, 2019

(65) Prior Publication Data
US 2020/0241892 A1    Jul. 30, 2020

(30) Foreign Application Priority Data
Oct. 9, 2017   (CN) .......................... 201710931802.8

(51) Int. Cl.
*G06F 9/44*    (2018.01)
*G06F 9/445*   (2018.01)
(Continued)

(52) U.S. Cl.
CPC .......... *G06F 9/44594* (2013.01); *G06F 9/449* (2018.02); *G06F 9/44521* (2013.01);
(Continued)

(58) Field of Classification Search
None
See application file for complete search history.

(56) References Cited

U.S. PATENT DOCUMENTS 6,701,334 B1    3/2004   Ye et al.
6,915,511 B2    7/2005   Susarla et al.
(Continued)

FOREIGN PATENT DOCUMENTS

CN     1360694 A     7/2002
CN     102253854 A   11/2011
(Continued)

Primary Examiner — Insun Kang
(74) Attorney, Agent, or Firm — Slater Matsil, LLP

(57) ABSTRACT

A class unloading method comprises: loading, by an electronic device, n classes after an application is started, where n is a positive integer; generating a reference mapping table, where the reference mapping table includes a reference relationship between the n classes and m class objects corresponding to the n classes and a dependency relationship between the m class objects corresponding to the n classes, the dependency relationship is used to represent an interdependency mapping relationship between different class objects, and m is a positive integer greater than or equal to n; and unloading a first class of the n classes based on the reference mapping table in an operation process of the application.

16 Claims, 16 Drawing Sheets

(51) Int. Cl.
  *G06F 9/448* (2018.01)
  *G06F 9/48* (2006.01)
(52) U.S. Cl.
  CPC ...... *G06F 9/4806* (2013.01); *G06F 2209/462* (2013.01); *G06F 2209/481* (2013.01)

(56) References Cited

U.S. PATENT DOCUMENTS

| | | | |
|---|---|---|---|
| 7,526,760 B1* | 4/2009 | Daynes | G06F 9/449 717/153 |
| 7,536,412 B2 | 5/2009 | Blohm | |
| 7,765,551 B2 | 7/2010 | Broberg | |
| 2002/0147971 A1 | 10/2002 | Adams | |
| 2004/0098724 A1* | 5/2004 | Demsey | G06F 12/0253 718/104 |
| 2008/0005190 A1* | 1/2008 | Fey | G06F 9/5016 |
| 2009/0031202 A1* | 1/2009 | Branda | G06F 11/1004 714/807 |
| 2013/0138703 A1* | 5/2013 | Daynes | G06F 9/44521 707/813 |
| 2014/0096110 A1 | 4/2014 | Charters et al. | |
| 2015/0301840 A1* | 10/2015 | Goetz | G06F 8/76 717/166 |
| 2016/0098346 A1* | 4/2016 | Pechanec | G06F 12/0261 707/814 |
| 2016/0154658 A1* | 6/2016 | Stoodley | G06F 9/44578 717/166 |
| 2016/0196119 A1* | 7/2016 | Yang | G06F 9/449 717/107 |
| 2018/0357008 A1* | 12/2018 | Hirt | G06F 3/0608 |

FOREIGN PATENT DOCUMENTS

| | | |
|---|---|---|
| CN | 102722432 A | 10/2012 |
| CN | 104182356 A | 12/2014 |
| CN | 105893110 A | 8/2016 |
| CN | 107220076 A | 9/2017 |

* cited by examiner

CLASS UNLOADING METHOD AND ELECTRONIC DEVICE

CROSS-REFERENCE TO RELATED APPLICATIONS

This application is a national stage of International Patent Application PCT/CN2017/106154, filed on Oct. 13, 2017, which claims priority to Chinese Patent Application No. 201710931802.8, filed on Oct. 9, 2017. Both of the aforementioned applications are hereby incorporated by reference in their entireties.

TECHNICAL FIELD

This application relates to the field of electronic technologies, and in particular, to a class unloading method and an electronic device.

BACKGROUND

At a system starting stage of an electronic device, a frequently used common class may always camp on a memory in a global loading manner, so that all processes or applications (application) can share a same class, thereby saving memory space. However, actually, not all classes are frequently used or are commonly used by many applications. Therefore, if all the classes always camp on the memory, a great amount of memory space is occupied, so that an objective of saving the memory space cannot be achieved.

In solutions provided in the prior art, a class can be dynamically loaded based on a requirement in an operation process of an application, to avoid an increase in occupied memory space caused by preloading of all the classes. For example, referring to FIG. 1a, in a solution provided in the prior art, a class corresponding to an application function is modularized and plugged in by using a plug-in technology, and a related module is loaded in a form of a plug-in when the class is required by a host application, thereby implementing a smart loading mode of the class. Referring to FIG. 1b, in another solution provided in the prior art, the application is divided into a plurality of modules (bundle) according to an open service gateway initiative (open service gateway initiative, OSGi) specification. Each module corresponds to a related class, a reference library, a context during operating, and the like. The modules are loaded and operated by classloaders (classloader) of the modules. When the module needs to be updated, an updated module is loaded by creating a new classloader.

However, in a solution provided in the prior art, referring to FIG. 2, a loaded class is unloaded when an application is closed, and regardless of whether the loaded class is operating, the loaded class always camps on the memory in the operation process of the application. Consequently, a great amount of memory space is occupied.

SUMMARY

Embodiments of this application provide a class unloading method and an electronic device, to dynamically unload a class in an operation process of an application and release memory space occupied by the class, thereby increasing available memory space of a system.

To achieve the foregoing objective, the following technical solutions are used in the embodiments of this application.

According to a first aspect, an embodiment of this application provides a class unloading method, including: loading, by an electronic device, n classes after an application is started, where n is a positive integer; generating a reference mapping table, where the reference mapping table includes a reference relationship between the n classes and m class objects corresponding to the n classes and a dependency relationship between the m class objects corresponding to the n classes, the dependency relationship is used to represent an interdependency mapping relationship between different class objects, and m is a positive integer greater than or equal to n; and then unloading, by the electronic device, a first class of the n classes based on the reference mapping table in an operation process of the application.

In this way, the electronic device may dynamically unload the class based on the reference mapping table in the operation process of the application, and release memory space occupied by the class in a timely manner, thereby increasing available memory space of a system.

With reference to the first aspect, in a possible implementation, before the unloading, by the electronic device, a first class of the n classes based on the reference mapping table, the method further includes: when a first class object of the m class objects is cleared from a memory, deleting, by the electronic device, a reference relationship of the first class object from the reference mapping table if the reference mapping table stores the reference relationship of the first class object; or deleting, by the electronic device, a reference relationship and a dependency relationship of the first class object from the reference mapping table if the reference mapping table stores the reference relationship and the dependency relationship of the first class object.

In this way, the reference relationship and the dependency relationship stored in the reference mapping table can be consistent with real-time states of the class and the class object in the operation process of the application.

With reference to the first aspect and the foregoing possible implementation, in another possible implementation, the unloading, by the electronic device, a first class of the n classes based on the reference mapping table includes: unloading, by the electronic device, the first class of the n classes based on the reference mapping table when there is an exception on the first class.

In this way, when determining that there is the exception on the first class in the operation process of the application, the electronic device can unload the first class in a timely manner, to release the memory space occupied by the first class.

With reference to the first aspect and the foregoing possible implementations, in another possible implementation, the unloading, by the electronic device, a first class of the n classes based on the reference mapping table includes: unloading, by the electronic device, the first class of the n classes based on the reference mapping table when an updated second class corresponding to the first class is detected.

In this way, when determining that the first class is updated in the operation process of the application, the electronic device can unload the first class in a timely manner, and release the memory space occupied by the first class.

With reference to the first aspect and the foregoing possible implementations, in another possible implementation, after the unloading, by the electronic device, a first class of the n classes based on the reference mapping table, the method further includes: loading, by the electronic device, a second class, and storing, by the electronic device, a reference relationship of a second class object or the reference relationship and the dependency relationship of the first class object into the reference mapping table when creating the second class object corresponding to the second class.

In this way, the electronic device may replace the first class with the updated second class in the operation process of the application, thereby fixing the first class on which the exception occurs or updating the first class.

With reference to the first aspect and the foregoing possible implementations, in another possible implementation, the unloading, by the electronic device, a first class of the n classes based on the reference mapping table includes: unloading, by the electronic device, the first class when the reference mapping table meets a preset condition, where the preset condition includes: priorities of all the class objects corresponding to the first class in the reference mapping table are less than or equal to a first preset threshold, and priorities of class objects on which all the class objects corresponding to the first class in the reference mapping table depend are less than or equal to a second preset threshold.

In this way, when the reference mapping table meets the preset condition, all the class objects corresponding to the first class and the class objects on which all the class objects corresponding to the first class depend are of relatively low importance, so that the electronic device can unload the first class.

With reference to the first aspect or the foregoing possible implementation manners, in another possible implementation manner, the method may further include: deleting, by the electronic device from the reference mapping table, the reference relationships and the dependency relationships of all the class objects corresponding to the first class.

In this way, when all the class objects corresponding to the first class and the class objects on which all the class objects corresponding to the first class depend are of relatively low importance, the electronic device may delete, from the reference mapping table, the reference relationships and the dependency relationships of all the class objects corresponding to the first class, so that the reference relationship and the dependency relationship stored in the reference mapping table can be consistent with the real-time states of the class and the class object in the operation process of the application.

With reference to the first aspect and the foregoing possible implementations, in another possible implementation, the unloading, by the electronic device, a first class of the n classes based on the reference mapping table includes: unloading, by the electronic device, the first class when the reference mapping table does not include reference relationships and dependency relationships of all class objects corresponding to the first class.

When the reference mapping table does not include the reference relationships and the dependency relationships of all the class objects corresponding to the first class, the first class may no longer be used, so that the electronic device can unload the first class in a timely manner.

With reference to the first aspect and the foregoing possible implementations, in another possible implementation, the unloading, by the electronic device, the first class when the reference mapping table does not include reference relationships and dependency relationships of all class objects corresponding to the first class includes: deleting, by the electronic device from the reference mapping table, the reference relationships and the dependency relationships of all the class objects corresponding to the first class when the reference mapping table meets a preset condition, so that the reference mapping table does not include the reference relationships and the dependency relationships of all the class objects corresponding to the first class; and unloading, by the electronic device, the first class.

In this way, when the preset condition is met, all the class objects corresponding to the first class and the class objects on which all the class objects corresponding to the first class depend are of relatively low importance, so that the electronic device can unload the first class.

With reference to the first aspect and the foregoing possible implementations, in another possible implementation, when the reference mapping table meets the preset condition, the method further includes: clearing, by the electronic device from the memory, all the class objects corresponding to the first class and the class objects on which all the class objects corresponding to the first class depend.

In this way, when the preset condition is met, all the class objects corresponding to the first class and the class objects on which all the class objects corresponding to the first class depend are of relatively low importance, so that the electronic device can clear, from the memory, all the class objects corresponding to the first class and the class objects on which all the class objects corresponding to the first class depend.

With reference to the first aspect and the foregoing possible implementations, in another possible implementation, a priority of a third class object is higher than the first preset threshold when the third class object corresponding to the first class in the reference mapping table is operating in the foreground; or a priority of a class object on which the third class object depends is higher than the second preset threshold when the class object on which the third class object depends is operating in the foreground.

In this way, when all the class objects corresponding to the first class and the class objects on which all the class objects corresponding to the first class are not operating in the foreground, the first class can be unloaded.

With reference to the first aspect and the foregoing possible implementations, in another possible implementation, after the generating, by the electronic device, the reference mapping table, the method further includes: deleting, by the electronic device, the reference mapping table when the application is closed.

In this way, when determining that the application closed, the electronic device deletes the reference mapping table corresponding to the application, and further clears the reference relationship and the dependency relationship of the class object created in the operation process of the application, thereby saving storage space of the electronic device.

According to a second aspect, an embodiment of this application provides an electronic device, including: a loading unit, configured to load n classes after an application is started, where n is a positive integer; a generating unit, configured to generate a reference mapping table, where the reference mapping table includes a reference relationship between the n classes and m class objects corresponding to the n classes and a dependency relationship between the m class objects corresponding to the n classes, the dependency relationship is used to represent an interdependency mapping relationship between different class objects, and m is a positive integer greater than or equal to n; and an unloading unit, configured to unload a first class of the n classes based on the reference mapping table in an operation process of the application.

With reference to the second aspect, in a possible implementation, the electronic device further includes: a deleting unit, configured to: before the unloading unit unloads the first class of the n classes based on the reference mapping table, when a first class object of the m class objects is cleared from a memory, delete a reference relationship of the first class object from the reference mapping table if the reference mapping table stores the reference relationship of the first class object; or delete a reference relationship and a dependency relationship of the first class object from the reference mapping table if the reference mapping table stores the reference relationship and the dependency relationship of the first class object.

With reference to the second aspect and the foregoing possible implementation, in another possible implementation, the unloading unit is specifically configured to unload the first class based on the reference relationship when there is an exception on the first class.

With reference to the second aspect and the foregoing possible implementations, in another possible implementation, the unloading unit is specifically configured to unload the first class of the n classes based on the reference mapping table when an updated second class corresponding to the first class is detected.

With reference to the second aspect and the foregoing possible implementations, in another possible implementation, the loading unit is further configured to: load the second class after the unloading unit unloads the first class of the n classes based on the reference mapping table; and store a reference relationship of a second class object or the reference relationship and the dependency relationship of the first class object into the reference mapping table when creating the second class object corresponding to the second class.

With reference to the second aspect and the foregoing possible implementations, in another possible implementation, the unloading unit is specifically configured to unload the first class when the reference mapping table does not include reference relationships and dependency relationships of all class objects corresponding to the first class.

With reference to the second aspect and the foregoing possible implementations, in another possible implementation, the unloading unit is specifically configured to: delete, from the reference mapping table, the reference relationships and the dependency relationships of all the class objects corresponding to the first class when the reference mapping table meets a preset condition, so that the reference mapping table does not include the reference relationships and the dependency relationships of all the class objects corresponding to the first class; and unload the first class, where the preset condition includes: priorities of all the class objects corresponding to the first class in the reference mapping table are less than or equal to a first preset threshold, and priorities of class objects on which all the class objects corresponding to the first class in the reference mapping table depend are less than or equal to a second preset threshold.

With reference to the second aspect and the foregoing possible implementations, in another possible implementation, the deleting unit is further configured to clear, from the memory, all the class objects corresponding to the first class and the class objects on which all the class objects corresponding to the first class depend when the reference mapping table meets the preset condition.

With reference to the second aspect and the foregoing possible implementations, in another possible implementation, a priority of a third class object is higher than the first preset threshold when the third class object corresponding to the first class in the reference mapping table is operating in the foreground; or a priority of a class object on which the third class object depends is higher than the second preset threshold when the class object on which the third class object depends is operating in the foreground.

With reference to the second aspect and the foregoing possible implementations, in another possible implementation, the deleting unit is further configured to: after the generating unit generates the reference mapping table, delete the reference mapping table when the application is closed.

According to a third aspect, an embodiment of this application provides an electronic device, including: one or more processors and one or more memories. The one or more memories are coupled to the one or more processors. The one or more memories are configured to store computer program code. The computer program code includes a computer instruction, and when the one or more processors execute the computer instruction, the electronic device performs the class unloading method according to any implementation of the first aspect.

According to a fourth aspect, an embodiment of this application provides a computer storage medium, including a computer instruction. When the computer instruction is run on an electronic device, the electronic device is enabled to perform the class unloading method according to any implementation of the first aspect.

According to a fifth aspect, an embodiment of this application provides a computer program product. When the computer program product is run on a computer, the computer is enabled to perform the class unloading method according to any implementation of the first aspect.

For beneficial effects related to the second aspect to the fifth aspect described above, refer to the foregoing descriptions in the first aspect. Details are not described herein again.

DETAILED DESCRIPTION OF ILLUSTRATIVE EMBODIMENTS

Figure 1A:
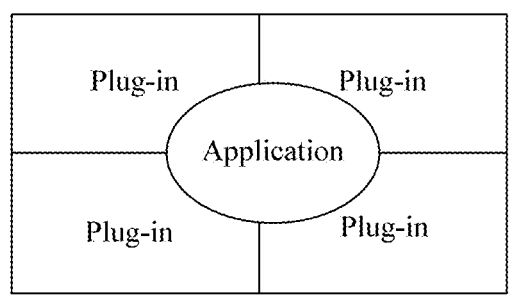
FIG. 1a is a schematic diagram of class loading according to an embodiment of this application.

For ease of understanding, examples of descriptions of some concepts related to embodiments of this application are provided as follows for reference:

A class (class) is a user-defined type in programming languages such as Java and is also referred to as a class type. Each class includes a data description and a set of functions used to operate data or transfer messages.

A class object is an instance of the class.

Reference is a manner in which the function is instantiated during programming. For example, the class object is a reference to the class.

Dependency relationship: If a change in an element of a class object indicates a change in another class object, there is a dependency relationship between the class object and the another class object, and the another class object depends on the class object. For example, if a class object uses another class object as a parameter for an operation, or a class object uses another class object as a data member of the class object, or a class object sends a message to another class object, there is a dependency relationship between the two class objects.

An installation package is a set of zipped files that can be unzipped by the zipped files. For example, the installation package may be an androidpackage (androidpackage, apk) and includes all files used to install an application. By running the installation package, all the files of the software can be released to a hard disk of an electronic device, so that the application operates on the electronic device.

In a solution provided in the prior art, a loaded class is unloaded when an application is closed, and regardless of whether the loaded class is operating, the loaded class always camps on a memory in an operation process of the application. Therefore, a great amount of memory space is occupied. Embodiments of this application provide a class unloading method and an electronic device, and in the operation process of the application, the loaded class may be dynamically unloaded based on a mapping relationship between the loaded class and the class object and a dependency relationship between created class objects, so that the memory space occupied by the class can be released in a timely manner after the class is unloaded, to save the memory space of the electronic device.

The following describes the technical solutions in the embodiments of this application with reference to the accompanying drawings in the embodiments of this application. In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

It should be noted that a device provided in the embodiments of this application may be an electronic device that can support an application in operating, for example, may be a terminal or a server. When the electronic device is the terminal, the electronic device may specifically be a device such as a mobile phone, a tablet computer, a notebook computer, an ultra-mobile personal computer (ultra-mobile personal computer, UMPC), a netbook, or a personal digital assistant (personal digital assistant, PDA).

Figure 3:
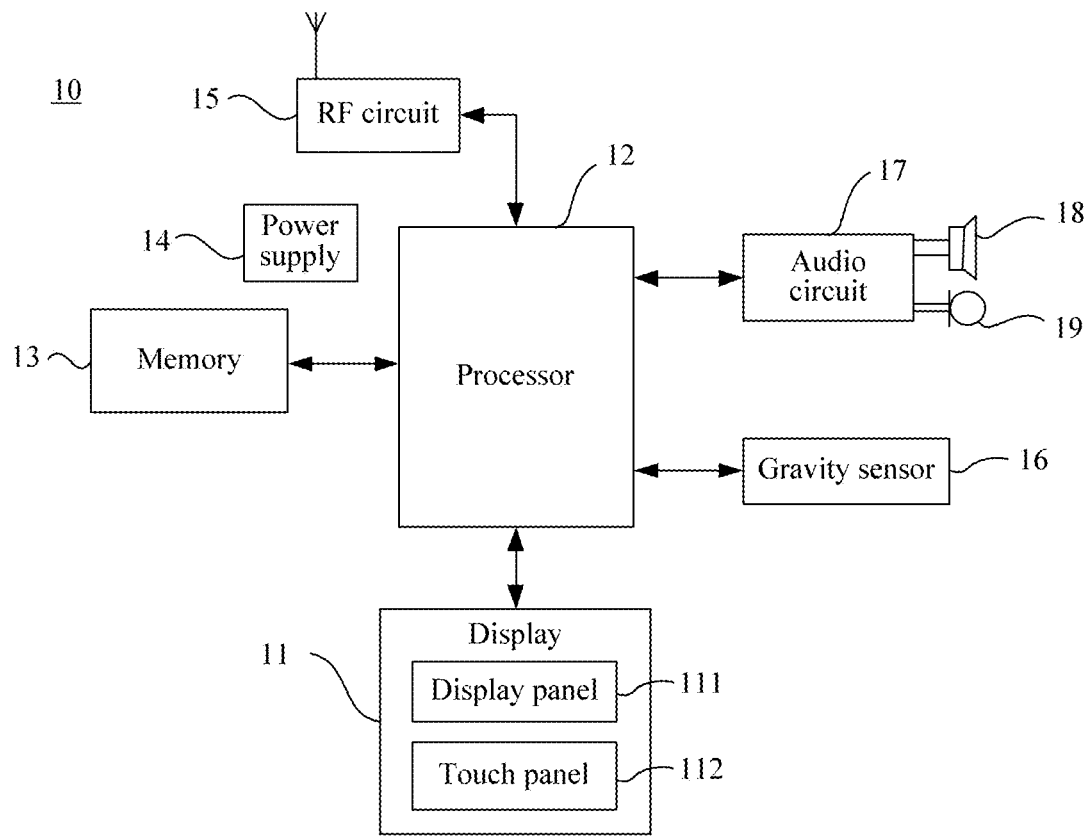
FIG. 3 is a schematic structural diagram of a mobile phone according to an embodiment of this application.

Specifically, in the embodiments of this application, the electronic device provided in the embodiments of this application is described by using a mobile phone as an example. As shown in FIG. 3, a mobile phone 10 may include components such as a display 11, a processor 12, a memory 13, a power supply 14, a radio frequency (radio frequency, RF) circuit 15, a gravity sensor 16, an audio circuit 17, a speaker 18, and a microphone 19. These components may be connected to each other by using a bus, or may be directly connected to each other. A person skilled in the art may understand that the structure of the mobile phone shown in FIG. 3 does not constitute any limitation to the mobile phone, and the mobile phone may include more components than those shown in the figure, or combine some components, or have a different component deployment.

The display 11 may be configured to display information input by a user or information provided for the user, and various menus of the mobile phone, and may further receive a user input operation. Specifically, the display 11 may include a display panel 111 and a touch panel 112.

The display panel 111 may be configured in a form of a liquid crystal display (liquid crystal display, LCD), an organic light-emitting diode (organic light-emitting diode, OLED), or the like.

The touch panel 112 may also be referred to as a touch-screen, a touch-sensitive screen, or the like, and may collect a contact or non-contact operation of the user on or near the touch panel 112 (such as an operation of the user on or near the touch panel 112 by using any proper object or accessory such as a finger or a stylus, or a motion sensing operation may be included, where the operation includes a single-point control operation, a multi-point control operation, and another type of operation), and drive a corresponding connection apparatus according to a preset program. Optionally, the touch panel 112 may include two parts: a touch detection apparatus and a touch controller. The touch detection apparatus detects a touch position and a gesture of the user, detects a signal generated by the touch operation, and transfers the signal to the touch controller. The touch controller receives a touch signal from the touch detection apparatus, converts the received touch signal into information that can be processed by the processor 12 and sends the information to the processor 12, and can receive a command sent by the processor 12 and execute the command. In addition, the touch panel 112 may be implemented by using various types, such as a resistive type, a capacitive type, an infrared type, and a surface sound wave type. Alternatively, the touch panel 112 may be implemented by using any technology developed in the future. This is not limited in the embodiments of this application.

Further, the touch panel 112 may cover the display panel 111. The user may perform an operation, according to content (the displayed content includes any one of or a combination of the following: a soft keyboard, a virtual mouse, a virtual button, an icon, or the like) displayed on the display panel 111, on or near the touch panel 112 covered by the display panel 111. After detecting the operation on or near the touch panel 112, the touch panel 112 transfers the operation to the processor 12 by using an input/output subsystem, to determine the user input. Subsequently, the processor 12 provides, based on the user input, corresponding visual output on the display panel 111 by using the input/output subsystem. Although, in FIG. 3, the touch panel 112 and the display panel 111 are used as two separate parts to implement input and output functions of the mobile phone, in some embodiments, the touch panel 112 and the display panel 111 may be integrated to implement the input and output functions of the mobile phone.

The processor 12 is a control center of the mobile phone 10, and is connected to various parts of the entire mobile phone by using various interfaces and lines. By running or executing a software program and/or module stored in the memory 13, and invoking data stored in the memory 13, the processor 12 performs various functions and data processing of the mobile phone 10, thereby performing overall monitoring on the mobile phone 10. During a specific implementation, in an embodiment, the processor 12 may include one or more processing units. The processor 12 may integrate an application processor and a modem processor. The application processor mainly processes an operating system, a user interface, an application, and the like. The modem processor mainly processes wireless communication. It may be understood that, the foregoing modem processor may also not be integrated into the processor 12.

The memory 13 may be configured to store data, a software program, and a module, and may be a volatile memory (volatile memory), for example, a random access memory (random access memory, RAM); or a non-volatile memory (non-volatile memory), for example, a read-only memory (read-only memory, ROM), a flash memory (flash memory), a hard disk drive (hard disk drive, HDD), or a solid-state drive (solid-state drive, SSD); or a combination of the foregoing types of memories.

The power supply 14 may be a battery, and is logically connected to the processor 12 by using a power management system, thereby implementing functions such as charging, discharging, and power consumption management by using the power management system.

The RF circuit 15 may be configured to receive and send signals during an information receiving and sending process or a call process. Particularly, the RF circuit 15 sends received information to the processor 12 for processing, and sends a signal generated by the processor 12. Usually, the RF circuit includes, but is not limited to, an antenna, at least one amplifier, a transceiver, a coupler, a low noise amplifier (low noise amplifier, LNA), a duplexer, and the like. In addition, the RF circuit 15 may also communicate with a network and another device through wireless communication.

The gravity sensor (gravity sensor) 16 may detect values of acceleration of the mobile phone in various directions (usually in three axes), may detect a value and a direction of gravity when the gravity sensor is static, and may be used in an application for identifying a mobile phone posture (for example, screen switching between a landscape mode and a portrait mode, a related game, and magnetometer posture calibration), a function related to vibration identification (for example, a pedometer and a knock), and the like. It should be noted that the mobile phone 10 may further include other sensors, such as a pressure sensor, an optical sensor, a gyroscope, a barometer, a hygrometer, a thermometer, an infrared sensor. Details are not described herein again.

The audio circuit 17, a speaker 18, and a microphone 19 may provide an audio interface between the user and the mobile phone 10. The audio circuit 17 may convert received audio data into an electrical signal and transmit the electrical signal to the speaker 18. The speaker 18 converts the electrical signal into a sound signal for output. In addition, the microphone 19 converts a collected sound signal into an electrical signal. The audio circuit 17 receives the electrical signal, converts the electrical signal into audio data, and outputs the audio data to the RF circuit 15, to send the audio data to, for example, another mobile phone, or outputs the audio data to the processor 12 for further processing.

Although not shown, the mobile phone 10 may further include a functional module such as a Wireless Fidelity (wireless fidelity, Wi-Fi) module, a Bluetooth module, or a camera. Details are not described herein again.

Specifically, a class unloading method and an electronic device provided in the embodiments of this application are described in detail below with reference to the mobile phone 10 shown in FIG. 3. It should be noted that the electronic device provided in the embodiments of this application may alternatively be any electronic device other than the mobile phone shown in FIG. 3.

Figure 4A:
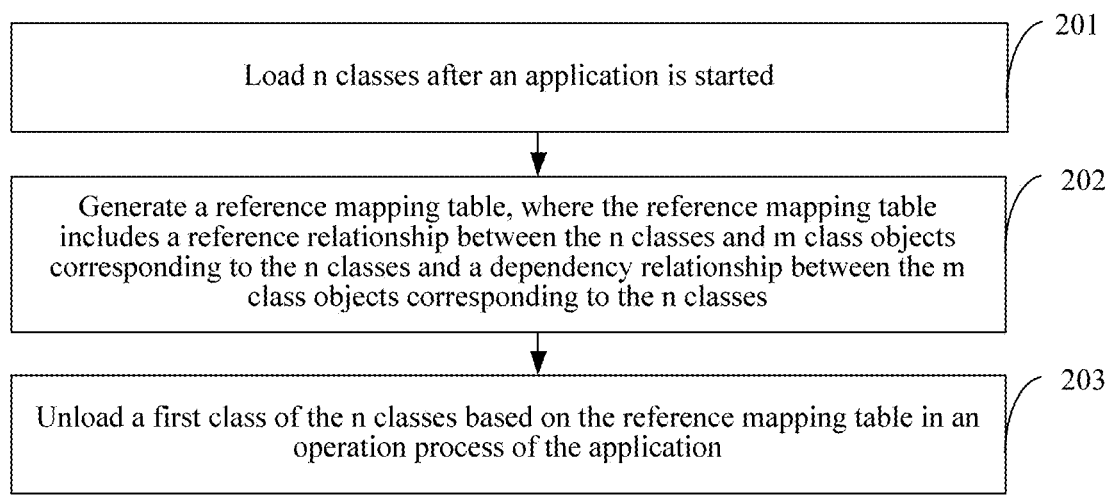
FIG. 4a is a flowchart of a method according to an embodiment of this application.
Figure 4B:
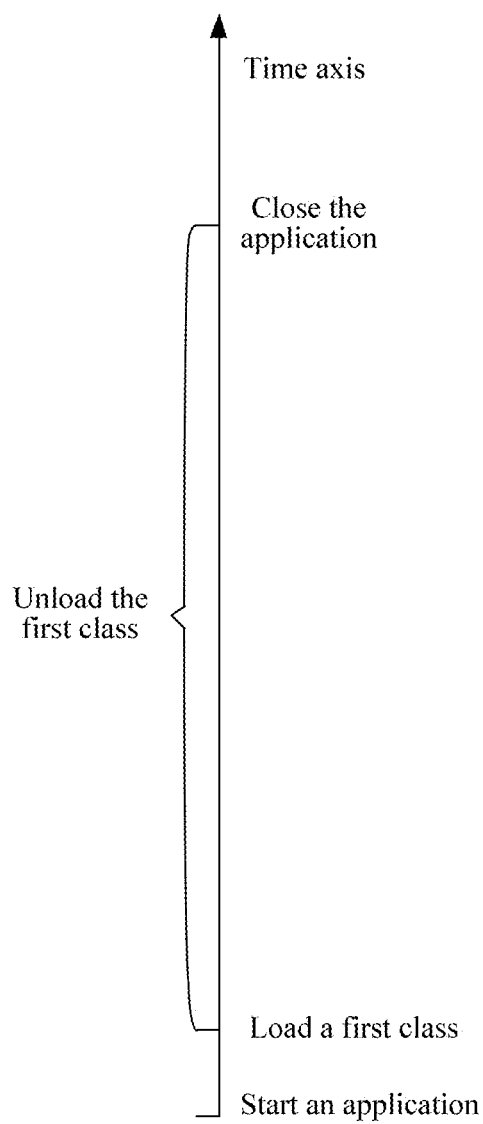
FIG. 4b is a sequence diagram of class unloading according to an embodiment of this application.

An embodiment of this application provides a class unloading method. Referring to FIG. 4a, the method may mainly include the following steps.

201. A mobile phone loads n classes after an application is started, where n is a positive integer.

Figure 1B:
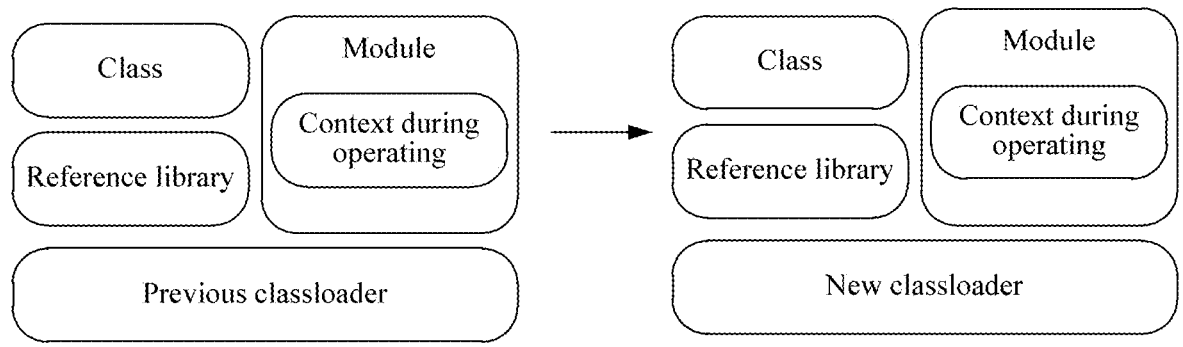
FIG. 1b is another schematic diagram of class loading according to an embodiment of this application.
Figure 2:
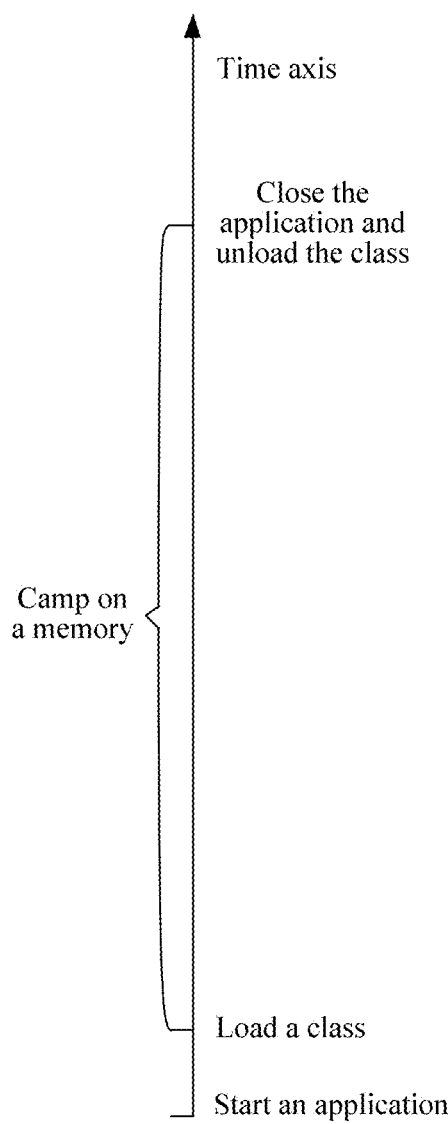
FIG. 2 is a sequence diagram of class unloading according to an embodiment of this application.

The application herein may be a system application of the mobile phone, or may be a third-party application; or the application may be an application provided by the mobile phone, or may be an application operating through an installation package. For example, the application in this embodiment of this application may specifically be WeChat, a video player, a browser, Taobao, or the like. After the application is started refers to a moment after the application is started, including a starting process of the application. After the application is started, the mobile phone may dynamically load, based on an operation requirement, a plurality of classes at different stages of an operation process of the application. For example, the mobile phone may load the n classes in the manner shown in FIG. 1a or FIG. 1b.

202. The mobile phone generates a reference mapping table, where the reference mapping table includes a reference relationship between the n classes and m class objects corresponding to the n classes and a dependency relationship between the m class objects corresponding to the n classes, the dependency relationship is used to represent an interdependency mapping relationship between different class objects, and m is a positive integer.

After the application is started, the mobile phone may load the classes based on the operation requirement by using a loader. After loading one class, the mobile phone may create one or more class objects of the class based on the class, and the class object may also be referred to as a reference or an instance of the class.

In addition, after the application is started, the mobile phone may generate and maintain a reference mapping table corresponding to the application, and the reference mapping table may store the reference relationship between the n classes loaded by the mobile phone and the m class objects corresponding to the n classes, and the dependency relationship between the m class objects corresponding to the n classes. A class included in the reference mapping table is a class loaded in the operation process of the application, and a class object included in the reference mapping table is a class object created in the operation process of the application.

Specifically, for each class of the n classes, the reference mapping table may store a reference relationship of the class, that is, a reference relationship between the class and all created class objects corresponding to the class. For each class object of the m class objects, the reference mapping table may store a reference relationship of the class object, that is, a reference relationship between the class object and a class corresponding to the class object. The reference mapping table may further store a dependency relationship of the class object, and the dependency relationship of the class object is a mapping relationship between the class object and a class object on which the class object depends. The reference relationship of the class includes reference relationships of all the class objects corresponding to the class.

For example, when the reference mapping table generated after the application is started is the following Table 1, a reference relationship of a class a may include reference relationships included in a number 1 and a number 2; and a reference relationship of a class object A1 is a reference relationship corresponding to the number 1.

It should be noted that the dependency relationship herein may include only a direct dependency relationship, or may include a direct dependency relationship and an indirect dependency relationship. The direct dependency relationship is a mapping relationship between a class object and a class object on which the class object directly depends, and the indirect dependency relationship is a mapping relationship between a class object and a class object on which the class object indirectly depends. For example, when the class object A1 depends on a class object B1 and the class object B1 depends on a class object C1, there is a direct dependency relationship between the class object A1 and the class object B1 and there is an indirect dependency relationship between the class object A1 and the class object C1. For example, when the dependency relationship includes only the direct dependency relationship, for the reference mapping table, refer to the following Table 1; or when the dependency relationship includes the direct dependency relationship and the indirect dependency relationship, for the reference mapping table, refer to the following Table 2.

TABLE 1

| Reference relationship | Dependency relationship | Number |
| --- | --- | --- |
| Class a to class object $A_1$ | Class object $A_1$ to class object $B_1$ and class object $C_1$ | 1 |
| Class a to class object $A_2$ | Class object $A_1$ to class object $C_2$ | 2 |
| Class b to class object $B_1$ | Class object $B_1$ to class object $C_3$ | 3 |
| Class c to class object $C_1$ | | 4 |
| Class c to class object $C_2$ | | 5 |
| Class c to class object $C_3$ | | 6 |

TABLE 2

| Reference relationship | | Dependency relationship | Number |
| --- | --- | --- | --- |
| Class a | Class object $A_1$ | Class object $A_1$ to class object $B_1$ and class object $A_1$ to class object $C_3$ Class object $A_1$ to class object $C_1$ | 1 |
| | Class object $A_2$ | Class object $A_1$ to class object $C_2$ | 2 |
| Class b | Class object $B_1$ | Class object $B_1$ to class object $C_3$ | 3 |
| Class c | Class object $C_1$ | | 4 |
| | Class object $C_2$ | | 5 |
| | Class object $C_3$ | | 6 |

It should be noted that, although the dependency relationship shown in Table 1 is the direct dependency relationship, the mobile phone may also obtain the indirect dependency relationship based on the direct dependency relationship shown in Table 1 through processing such as calculation or a search. When the reference mapping table stores only the direct dependency relationship, storage space of the mobile phone can be saved.

Specifically, the mobile phone may generate, by monitoring an operating status (for example, a started state or a closed state) of the application, the reference mapping table after the application is started, or may generate the reference mapping table when creating a class object (or loading a class) after the application is started. In addition, after the application is started, when creating each class object, the mobile phone may store the reference relationship between the class object and the class into the reference mapping table. If the class object depends on another class object, the mobile phone may further store the dependency relationship of the class object into the reference relationship table.

In this way, the mobile phone may store the reference relationship between the loaded classes and the created class objects and the dependency relationship between the created class objects through the reference mapping table. In addition, the reference relationship and the dependency relationship stored in the reference mapping table dynamically change and are consistent with real-time states of the classes and the class objects in the operation process of the application.

203. In an operation process of the application, the mobile phone unloads a first class of the n classes based on the reference mapping table.

The first class herein is any one of the n classes included in the mapping relationship table. In step 203, the mobile phone may dynamically unload, based on the reference relationship between the loaded classes and the created class objects and the dependency relationship between the created class objects stored in the reference mapping table in step 202, a loaded class in the operation process of the application. That is, the mobile phone can unload a class based on real-time states of the class and a class object in the reference mapping table, to release, in a timely manner, memory space occupied by the unloaded class.

Therefore, compared with the prior art in which the class cannot be unloaded and the memory space occupied by the class cannot be released until the application is closed, according to the class unloading method provided in this embodiment of this application, the class can be dynamically unloaded in the operation process of the application, and the memory space occupied by the class is released in a timely manner, thereby increasing available memory space of a system.

In addition, in this embodiment of this application, the mobile phone may provide an unloading interface through a classloader, and when the class needs to be unloaded based on the reference mapping table, the mobile phone can unload the class by using the unloading interface provided by the classloader.

Figure 5:
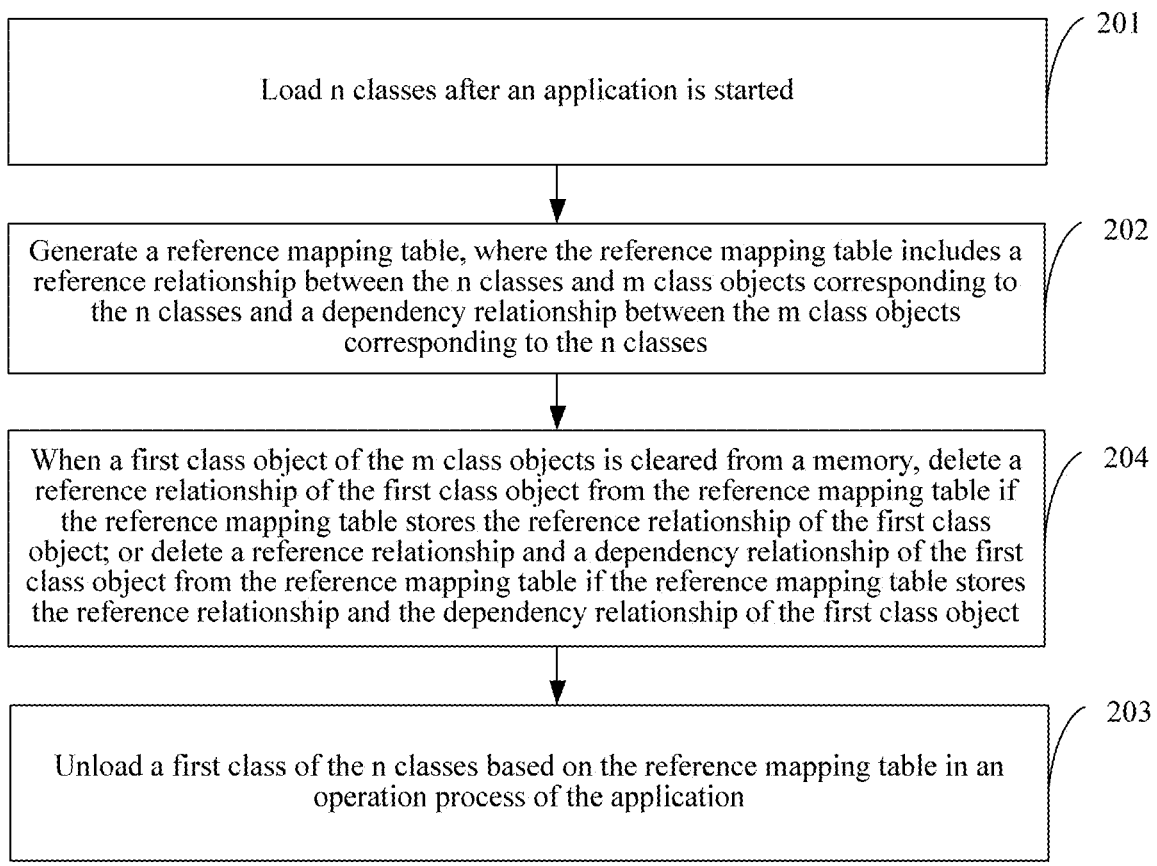
FIG. 5 is a flowchart of another method according to an embodiment of this application.

Further, referring to FIG. 5, before step 203, the method may further include the following step.

204. When a first class object of the m class objects is cleared from a memory, the mobile phone deletes a reference relationship of the first class object from the reference mapping table if the reference mapping table stores the reference relationship of the first class object; or the mobile phone deletes a reference relationship and a dependency relationship of the first class object from the reference mapping table if the reference mapping table stores the reference relationship and the dependency relationship of the first class object.

The reference relationship of the first class object is used to represent a mapping relationship between the first class object and the first class, and the dependency relationship of the first class object is used to represent a mapping relationship between the first class object and a class object on which the first class object depends.

Due to a memory release mechanism of the system (for example, an Android operating system) or other reasons, a created class object may be cleared in the operation process of the application. For example, the system may find, based on a preset time interval, whether one or more created class objects can be cleared from the memory, or the system may find whether one or more created class objects can be cleared from the memory when there is not enough available memory space.

When one of the m class objects is cleared from the memory, the mobile phone may delete the reference relationship of the first class object from the reference mapping table if the reference mapping table stores the reference relationship of the first class object, or the mobile phone deletes the reference relationship and the dependency relationship of the first class object from the reference mapping table if the reference mapping table stores the reference relationship and the dependency relationship of the first class object, to update the reference mapping table, so that the reference relationship and the dependency relationship stored in the reference mapping table are consistent with the real-time states of the class and the class object in the operation process of the application. In this case, the mobile phone can unload any one of the n classes based on an updated reference mapping relationship table in step 203.

For example, the class object C1 in Table 1 is used as an example. Because the class object C1 does not depend on another class object, the reference mapping table stores only a reference relationship of the class object C1 and does not include a dependency relationship of the class object C1. Due to the memory release mechanism of the system or other reasons, the mobile phone may delete the reference relationship of the class object C1 from the reference mapping table when the class object C1 is cleared from the memory.

Figure 6:
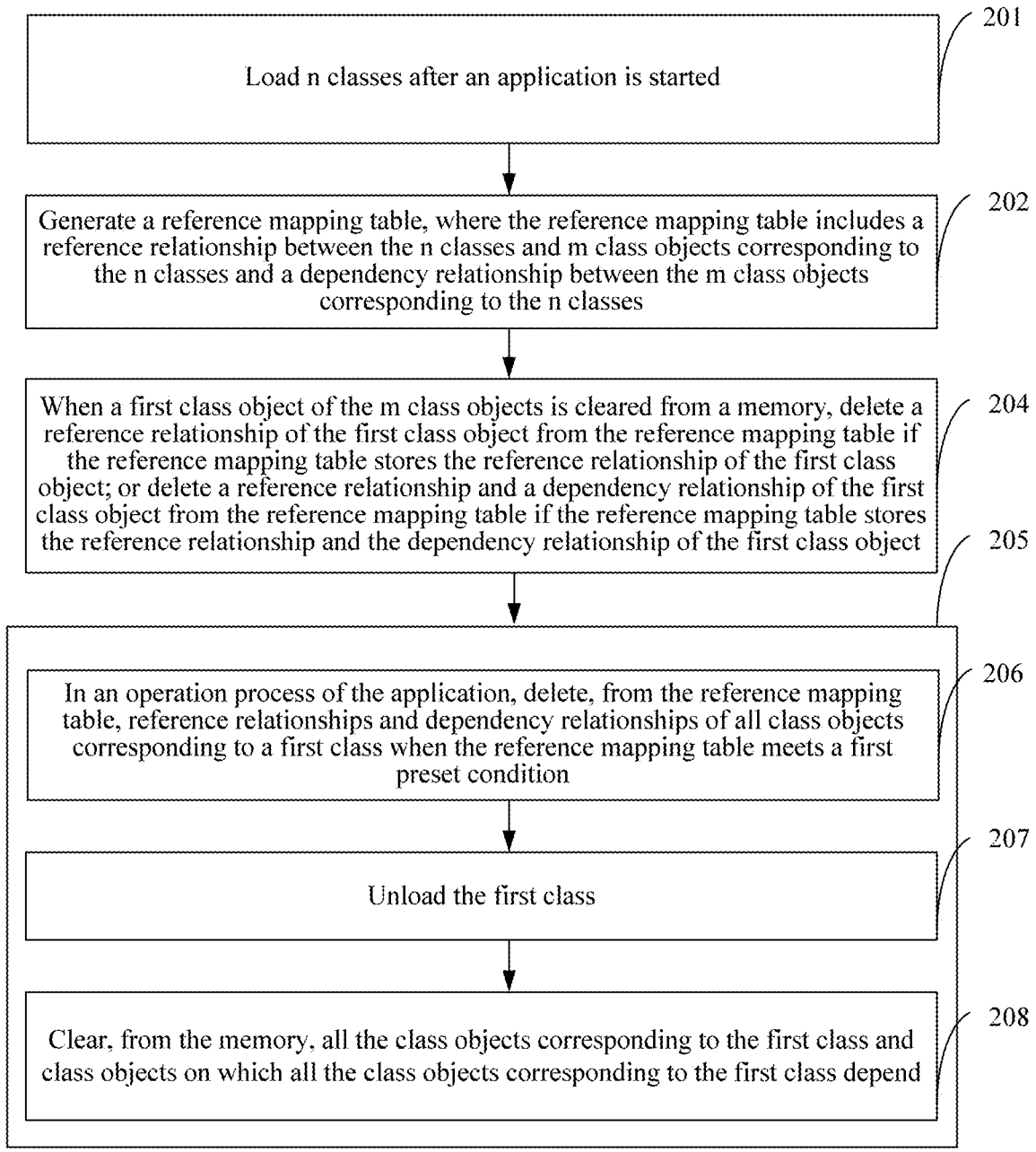
FIG. 6 is a flowchart of another method according to an embodiment of this application.

Specifically, referring to FIG. 6, in the foregoing step 203, that the mobile phone unloads a first class of the n classes based on the reference mapping table may include the following step.

205. The mobile phone unloads the first class when the reference mapping table does not include reference relationships and dependency relationships of all class objects corresponding to the first class.

Because the reference relationship and the dependency relationship stored in the reference mapping table are consistent with the real-time states of the class and the class object in the operation process of the application, all the class objects corresponding to the first class object may be cleared from the memory when the reference mapping table does not include the reference relationships and the dependency relationships of all the class objects corresponding to the first class, so that the mobile phone can unload the first class.

In a specific implementation, referring to FIG. 6, the foregoing step 205 may include the following steps.

206. The mobile phone deletes, from the reference mapping table, the reference relationships and the dependency relationships of all the class objects corresponding to the first class when the reference mapping table meets a first preset condition, so that the reference mapping table does not include the reference relationships and the dependency relationships of all the class objects corresponding to the first class.

The first preset condition may include: priorities of all the class objects corresponding to the first class in the reference mapping table are less than or equal to a first preset threshold, and priorities of class objects on which all the class objects corresponding to the first class in the reference mapping table depend are less than or equal to a second preset threshold.

207. The mobile phone unloads the first class.

A priority of the class object may be used to represent importance of the class object. When the priorities of all the class objects corresponding to the first class in the reference mapping table are less than or equal to the first preset threshold, and the priorities of the class objects on which all the class objects corresponding to the first class in the reference mapping table depend are less than or equal to the second preset threshold, it may indicate that all the class objects corresponding to the first class in the reference mapping table are of relatively low importance (for example, the class objects are no longer used, or the class objects are not used for a long time), and that the class objects on which all the class objects corresponding to the first class depend are also of relatively low importance. In this case, the mobile phone may delete, from the reference mapping table, the reference relationships and the dependency relationships of all the class objects corresponding to the first class, and unload the first class of relatively low importance.

It should be noted that, in step 206, the first preset threshold may be the same as or different from the second preset threshold. When the first class in the reference mapping table corresponds to a plurality of class objects, different class objects may correspond to one value of the first preset threshold, or may correspond to different values of the first preset threshold, in other words, the first preset threshold may specifically include one value, or may include a plurality of values. Similarly, when all the class objects corresponding to the first class in the reference mapping table depend on a plurality of class objects, the second preset threshold may also specifically include one value, or include a plurality of values. In addition, a specific value of the first preset threshold or the second preset threshold may change at different stages of the application operation.

The priority may specifically be classified based on a preset service policy. For example, in a classification manner, a class object in the foreground may have a higher priority than a class object in the background. In another case, a class object that is used more frequently has a higher priority than a class object that is used less frequently. In another case, a class object that is not used within a relatively long period of time has a higher priority than a class object that is not used within a relatively short period of time. In another case, a class object on which more class objects depend has a higher priority than a class object on which fewer class objects depend. Specifically, the priority may be indicated in a plurality of manners. For example, the priority may be indicated by a grade, or may be indicated by a score based on a preset scoring mechanism.

In an implementation, a priority of a third class object is higher than the first preset threshold when the third class object corresponding to the first class in the reference mapping table is operating in the foreground; or a priority of a class object on which the third class object depends is higher than the second preset threshold when the class object on which the third class object depends is operating in the foreground. To be specific, in the implementation, when the class object corresponding to the first class in the reference mapping table is operating in the foreground or the class object on which the class object corresponding to the first class depends is operating in the foreground, the first class cannot be unloaded; otherwise, an error may occur in a foreground operating program, thereby affecting use of a user.

For example, when the first class is the class a, as shown in Table 1, when priorities of the class object A1 and the class object A2 corresponding to the class a are less than or equal to the first preset threshold and priorities of the class object B1, the class object C1, and the class object C2 on which the class object A1 and the class object A2 depend are less than or equal to the second preset threshold, the mobile phone can unload the class a.

It should be noted that, when determining whether the reference mapping table meets the first preset condition, compared with using the reference mapping table shown in Table 1, the mobile phone may more quickly find, by using the reference mapping table shown in Table 2, all the class objects on which the class objects corresponding to the first class directly and indirectly depend, and determine priorities of the depended class objects, thereby improving efficiency of class unloading and reducing a processing latency.

Further, when the reference mapping table meets the first preset condition, the method may further include the following step.

208. The mobile phone clears, from the memory, all the class objects corresponding to the first class and class objects on which all the class objects corresponding to the first class depend.

The mobile phone may clear, from the memory, all the class objects corresponding to the first class and the class objects on which all the class objects corresponding to the first class depend when the reference mapping table meets the first preset condition, thereby releasing space occupied by all the class objects corresponding to the first class and the class objects on which all the class objects corresponding to the first class depend, and saving the memory space of the system.

It should be noted that, when the reference mapping table meets the first preset condition, there is no clear sequence in the foregoing step 206, step 207, and step 208. When deleting, from the reference mapping table, the reference relationships and the dependency relationships of all the class objects corresponding to the first class in step 206, the mobile phone clears, from the memory, all the class objects corresponding to the first class and the class objects on which all the class objects corresponding to the first class depend in step 208, so that the reference relationships and the dependency relationships stored in the reference mapping table can be consistent with the real-time states of the classes and the class objects in the operation process of the application.

Specifically, in step 206 and step 208, when a priority of the first class object corresponding to the first class is less than or equal to the first preset threshold and a priority of the class object on which the first class object depends is less than or equal to the second preset threshold, the mobile phone may clear, from the memory, the first class object and the class object on which the first class object depends, and delete the dependency relationship of the first class object.

For example, when the first class is the class a, and the reference mapping table is shown in Table 1, the mobile phone may determine the priorities of the class objects based on an order of the class object A1 to the class object B1 and the class object C1 to the class object C2. For example, if the first preset threshold and the second preset threshold are equal and both are 60 points, the mobile phone may first determine whether a priority of the class object A1 is less than or equal to 60 points. If the priority of the class object A1 is greater than 60 points, the class object A1 cannot be cleared from the memory, and the first class cannot be unloaded. If the priority of the class object A1 is less than or equal to 60 points, the mobile phone determines whether priorities of the class object B1 and the class object C1 on which the class object A1 directly depends are less than or equal to 60 points. If the priorities of the class object B1 and the class object C1 are greater than 60 points, the first class cannot be unloaded. If the priorities of the class object B1 and the class object C1 are less than or equal to 60 points, the first class cannot be unloaded when a priority of the class object C3 on which the class object A1 indirectly depends (the class object C3 is also a class object on which the class object B1 directly depends) is greater than 60 points. When the priority of the class object C3 on which the class object A1 indirectly depends is less than or equal to 60 points, the mobile phone may clear the class object A1, the class object B1, and the class object C3, and delete the dependency relationship of the class object A1 and a reference relationship between the class object A1 and the class a.

Similar to the process of clearing the class object A1, the mobile phone may clear the class object A2, and delete a dependency relationship of the class object A2 and a reference relationship between the class object A2 and the class a.

Because in the reference mapping table, all the class objects corresponding to the class a include the class object A1 and the class object A2, when the reference relationship and the dependency relationship of the class object A1 and the reference relationship and the dependency relationship of the class object A2 are deleted, that is, when two rows corresponding to the number 1 and the number 2 in Table 1 are deleted, the reference mapping table does not include the reference relationships and the dependency relationships of all the class objects corresponding to the class a. In this case, the mobile phone can unload the class a. For a reference mapping table obtained after the reference relationship and the dependency relationship of the class object A1 and the reference relationship and the dependency relationship of the class object A2 are deleted, refer to Table 3.

In addition, in one case of step 205, when all the class objects corresponding to the first class do not depend on another class object, the reference mapping table may include the reference relationship of the first class, and does not include the dependency relationship of the class object corresponding to the first class. In this case, when all the class objects corresponding to the first class are cleared from the memory, the reference mapping table does not include the reference relationship and the dependency relationship of the first class when the reference relationship of the first class is deleted, so that the mobile phone can unload the first class.

Due to the memory release mechanism of the system or other reasons, the first class may no longer be used when all the class objects corresponding to the first class are cleared from the memory, so that the mobile phone can unload the first class.

For example, when the first class is the class c in Table 1, all the class objects corresponding to the class c do not depend on another class object, so that the reference mapping table stores only a reference relationship of the class object corresponding to the class c, and does not include a dependency relationship of the class object corresponding to the class c. Due to the memory release mechanism of the system or other reasons, the mobile phone may delete a reference relationship of the class c from the reference mapping table when the class object C1, the class object C2, and the class object C3 corresponding to the class c are cleared from the memory, so that the reference mapping table does not include the reference relationship and the dependency relationship of the class c, thereby unloading the class c.

In another implementation, although not shown in the accompanying drawings, that the mobile phone unloads a first class of the n classes based on the reference mapping table in the foregoing step 203 may include the following steps.

209. The mobile phone unloads the first class when the reference mapping table meets the first preset condition.

210. The mobile phone deletes, from the reference mapping table, the reference relationships and the dependency relationships of all the class objects corresponding to the first class.

In step 209 and step 210, when the reference mapping table meets the first preset condition, it may indicate that the class object corresponding to the first class has a relatively low priority and is of relatively low importance, and the class object on which the class object corresponding to the first class depends also has a relatively low priority and is of relatively low importance, so that the mobile phone can unload the first class, and delete, from the reference mapping table, the reference relationships and the dependency relationships of all the class objects corresponding to the first class.

Figure 7:
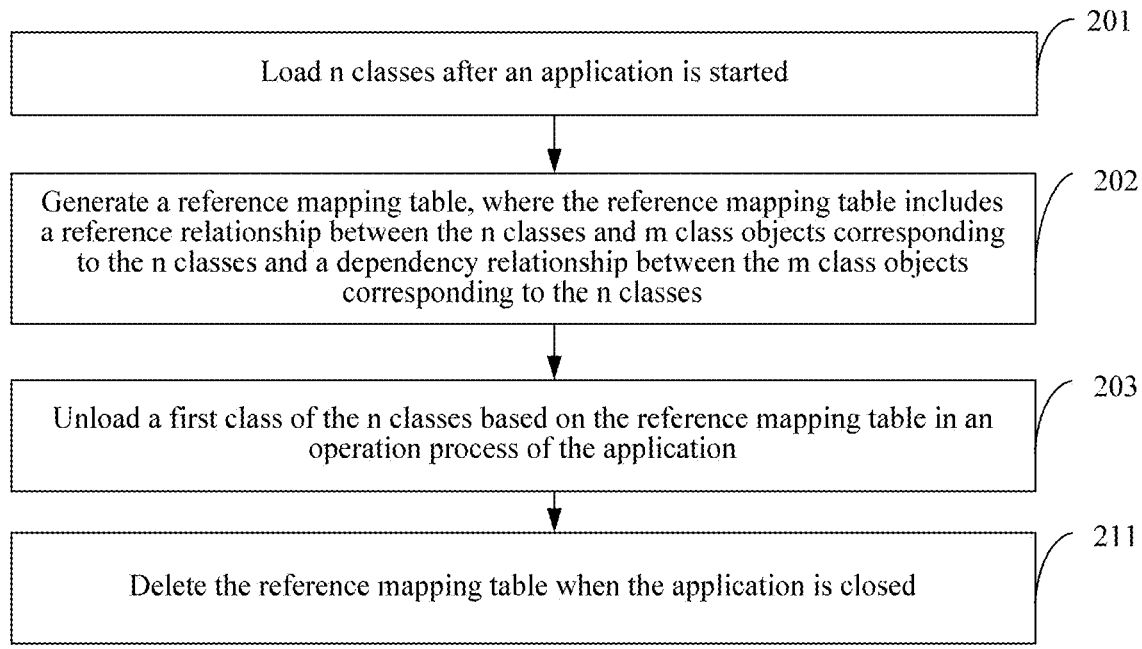
FIG. 7 is a flowchart of another method according to an embodiment of this application.

Further, referring to FIG. 7, after the foregoing step 202, the method provided in this embodiment of this application may further include the following step.

211. The mobile phone deletes the reference mapping table when the application is closed.

When determining that the application is closed, the mobile phone may delete, by monitoring an operating status of the application, the reference mapping table corresponding to the application, and further clear the reference relationship and the dependency relationship of the class object created in the operation process of the application, thereby saving storage space of the mobile phone.

Figure 8:
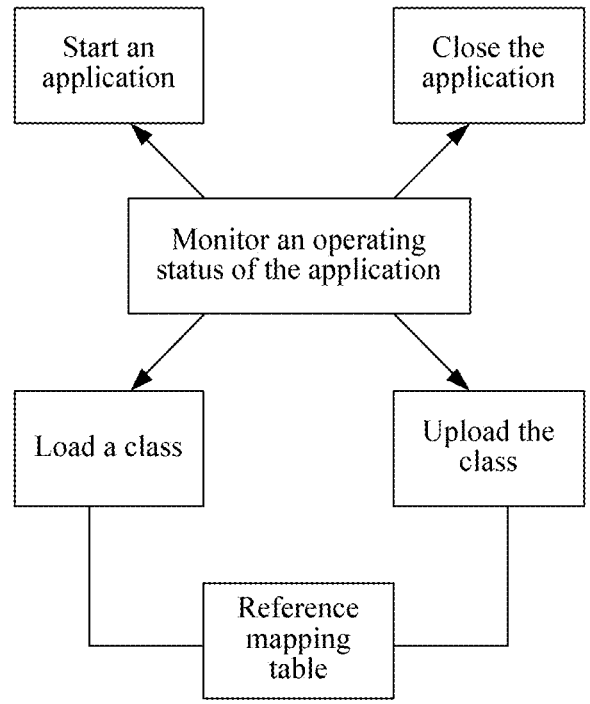
FIG. 8 is a flowchart of another method according to an embodiment of this application.

Therefore, referring to FIG. 8, according to the method provided in this embodiment of this application, the reference mapping table may be generated by monitoring the operating status of the application, and the class is dynamically loaded or unloaded based on the reference mapping table, or the reference mapping table is deleted.

Specifically, in the foregoing step 203, the mobile phone can unload the first class of the n classes based on the reference mapping table when a second preset condition is met.

For example, although not shown in the accompanying drawings, in a case, step 203 may include the following step in the operation process of the application.

301. The mobile phone unloads the first class based on the reference relationship when there is an exception on the first class.

In another case, step 203 may include the following step in the operation process of the application.

302. The mobile phone unloads the first class of the n classes based on the reference mapping table when an updated second class corresponding to the first class is detected.

It should be noted that, in addition to the second preset condition described in step 301 or step 302, the mobile phone may alternatively unload the first class of the n classes based on the reference mapping table when another preset condition is met. For example, when duration in which the application operates in the background is greater than or equal to preset duration, the mobile phone unloads the first class. This is not specifically limited in this embodiment of this application.

In addition, it should be noted that, in step 301 and step 302, that the mobile phone unloads the first class of the n classes based on the reference mapping table may be specifically implemented based on the foregoing step 205, or step 206 to step 208, or step 209 and step 210.

Further, after step 301 or step 302, the method may further include the following steps.

303. The mobile phone loads the second class.

304. The mobile phone stores a reference relationship of a second class object or the reference relationship and the dependency relationship of the first class object into the reference mapping table when creating the second class object corresponding to the second class.

The mobile phone may store the reference relationship of the second class object into the reference mapping table when creating the second class object corresponding to the second class. If the second class object depends on another class object, the mobile phone may further store the dependency relationship of the second class object into the reference mapping table. In this way, the reference relationship and the dependency relationship stored in the reference mapping table can be consistent with the real-time states of the class and the class object in the operation process of the application, so that the mobile phone can unload the class based on the real-time states of the class and the class object in the reference mapping table.

Figure 9:
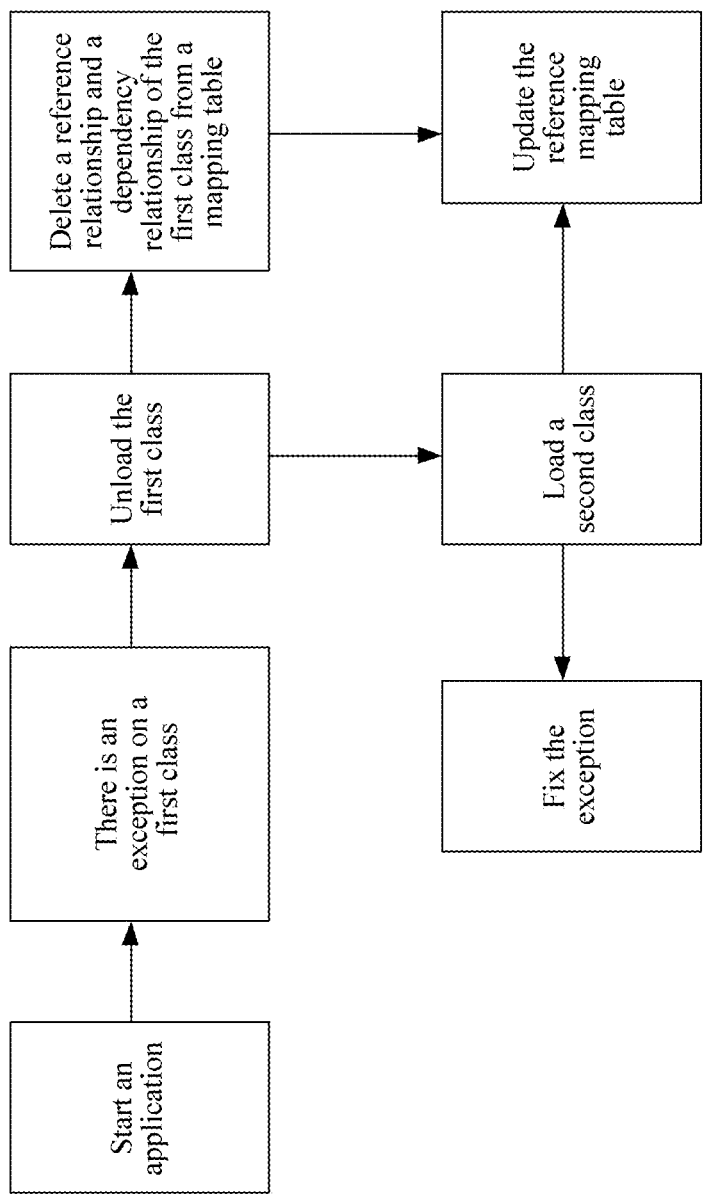
FIG. 9 is a flowchart of another method according to an embodiment of this application.

Referring to FIG. 9, when the foregoing step 203 is specifically implemented through step 209 and step 210, in a scenario described in the foregoing step 301, step 303, and step 304, the mobile phone may monitor the operating status of the application through an application layer, and determine, when there is the exception on the first class in the operation process of the application, to invoke a class unloading interface provided by the classloader, so that the mobile phone may attempt to unload, based on the reference mapping table, the first class by performing step 203. If the first class does not meet the condition in step 205 and does not meet the conditions in step 206 to step 208, the mobile phone cannot successfully unload the first class. If the first class meets the condition in step 205, or the first class meets the conditions in step 206 to step 208, the mobile phone can successfully unload the first class.

After the first class is successfully unloaded, the second class obtained after the first class is updated is loaded in the operation process of the application, where the second class is a class obtained after the first class is fixed. In addition, when creating the second class object corresponding to the second class, the mobile phone stores the reference relationship of the second class object or the reference relationship and the dependency relationship of the first class object into the reference mapping table, so that hot replacement and hot fix of code can be implemented in a quick and accurate manner in the operation process of the application, and a function of the first class in the operation process of the application is recovered. The second class and the first class may have a preset association relationship, to help the mobile phone detect the second class corresponding to the first class. For example, the second class and the first class may have a same identifier but different storage locations.

Alternatively, in the scenario described in the foregoing step 301, step 303, and step 304, step 301 may further include: The mobile phone can unload the first class of the n classes based on the reference mapping table where there is the exception on the first class and the updated second class corresponding to the first class is detected. In other words, when the mobile phone determines that there is the exception on the first class in the operation process of the application and detects that the mobile phone stores the second class obtained after the first class is updated, that is, when a developer obtains the second class after fixing the first class, the mobile phone may attempt to unload, based on the reference mapping table, the first class by performing step 203.

Specifically, in this embodiment of this application, when determining that there is the exception on the first class in the operation process of the application, the mobile phone may request, from a server, to download the second class obtained after the first class is updated; or the mobile phone may periodically obtain a plurality of updated classes from a server or receive a plurality of updated classes pushed by a server, where the plurality of updated classes may include the second class obtained after the first class is updated.

It should be noted that, due to a large amount of code of an update package, when there are or may be some problems in the application, states such as a logic exception or even a crash occur in the operation process. However, impact of the problems is not enough for the mobile phone to issue a system update package to fix the application. For example, when there is an exception on a class of the application, in this embodiment of this application, the second class is obtained from the server and the first class is replaced with the second class, so that the first class can be fixed or updated. Because the class has a small amount of code, less traffic is required to obtain the second class, a speed is faster, and processing efficiency of replacing the first class with the second class is also higher.

Figure 10A:
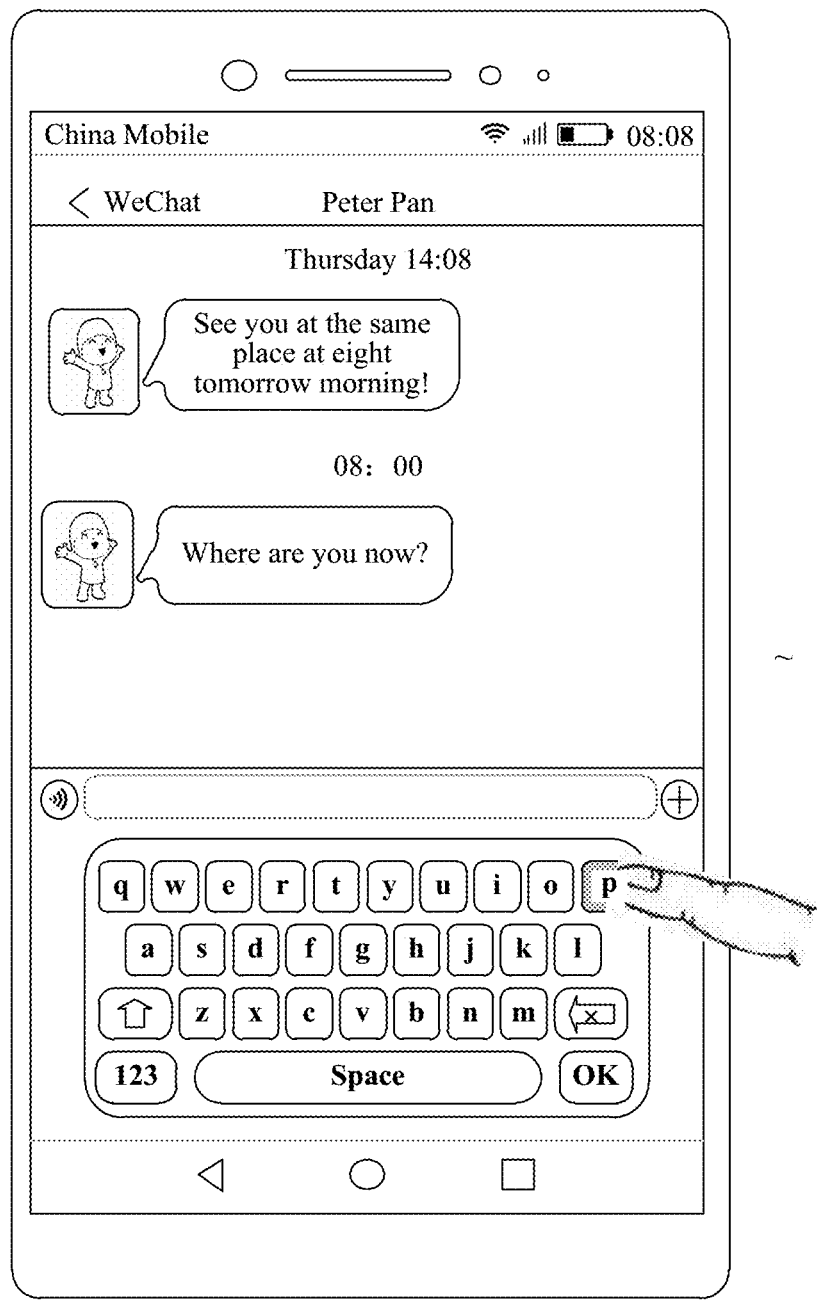
FIG. 10A, FIG. 10B, and FIG. 10C are schematic diagrams of a scenario according to an embodiment of this application.
Figure 10B:
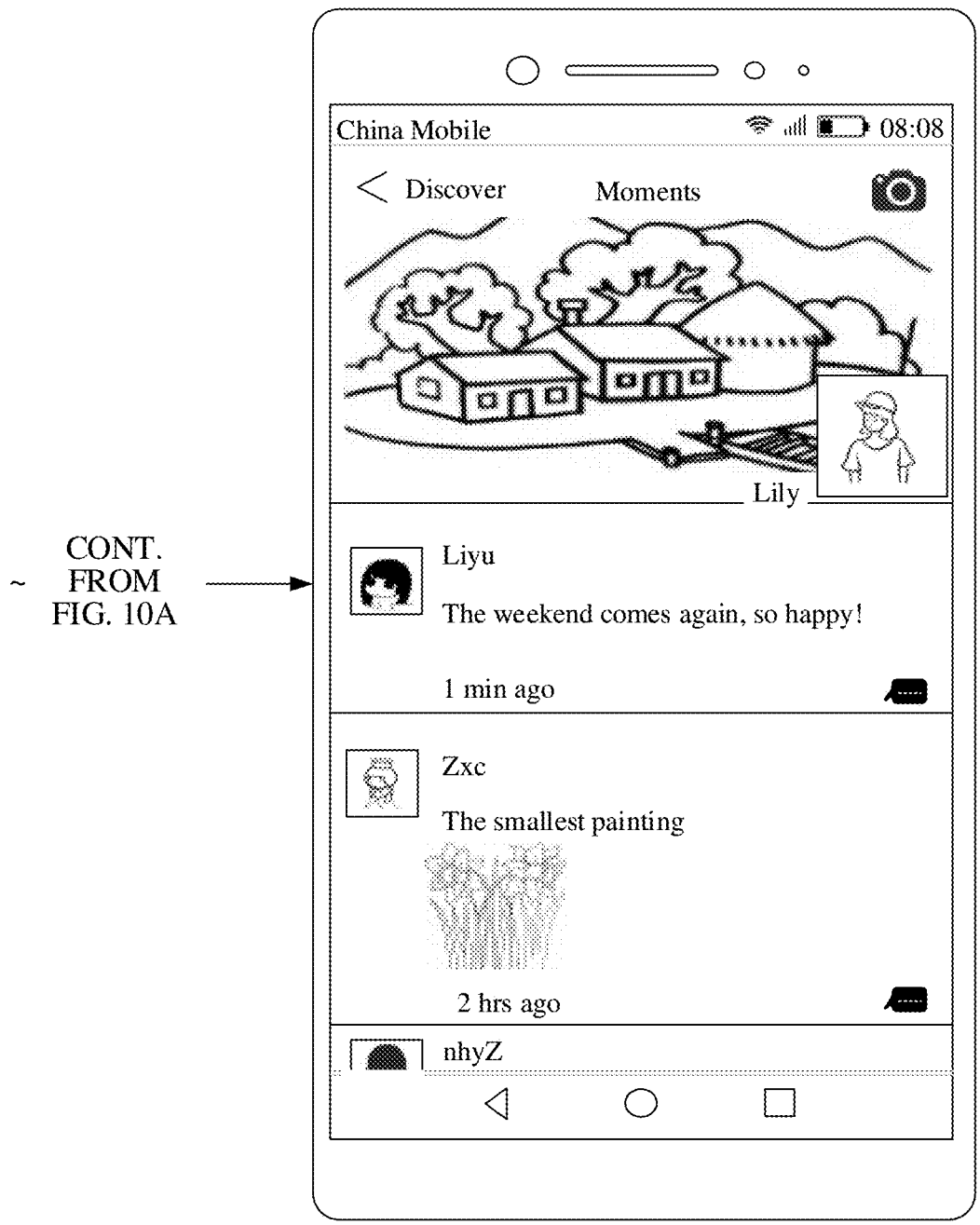
Figure 10C:
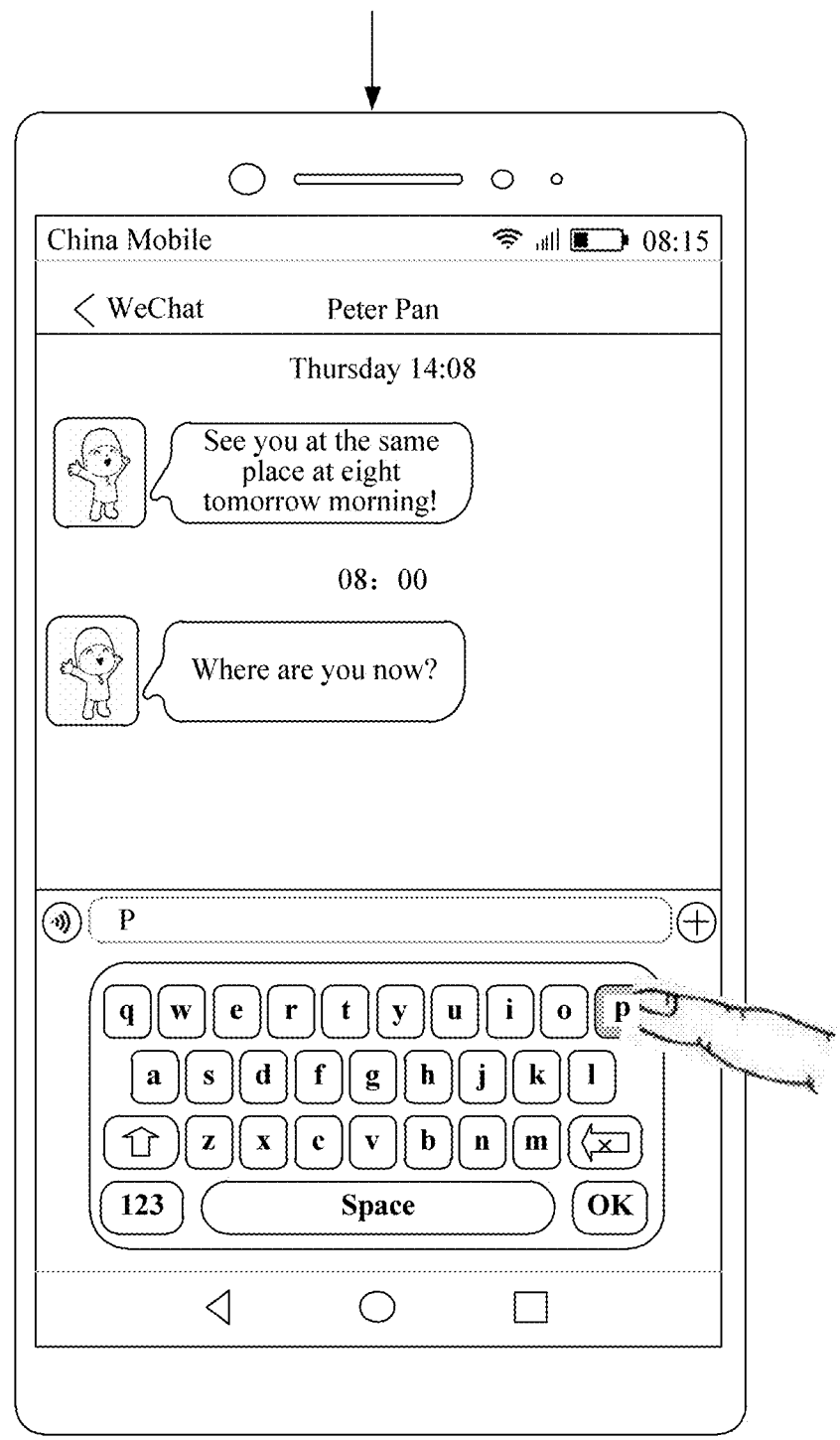

For example, referring to FIG. 10, in an operation process of WeChat, when a class used to enter text in a chat interface at 08:08 has a problem that causes a user to be unable to enter the text, the user may not enter the text within a short period of time. For example, the user may first check Moments, or may enter voice or view chat histories. In a case in which WeChat is not closed, after a period of time, for example, at 08:15, the user may normally enter the text in the chat interface. This is because when the user input the voice, check Moments, or view the chat histories, the mobile phone may unload the class corresponding to entering the text in the chat interface, and load a fixed class, so that in a case in which the user is unaware, the problem of unable to enter the text in the chat interface is quickly fixed.

Figure 11A:
FIG. 11A, FIG. 11B, and FIG. 11C are schematic diagrams of a scenario according to an embodiment of this application.
Figure 11B:
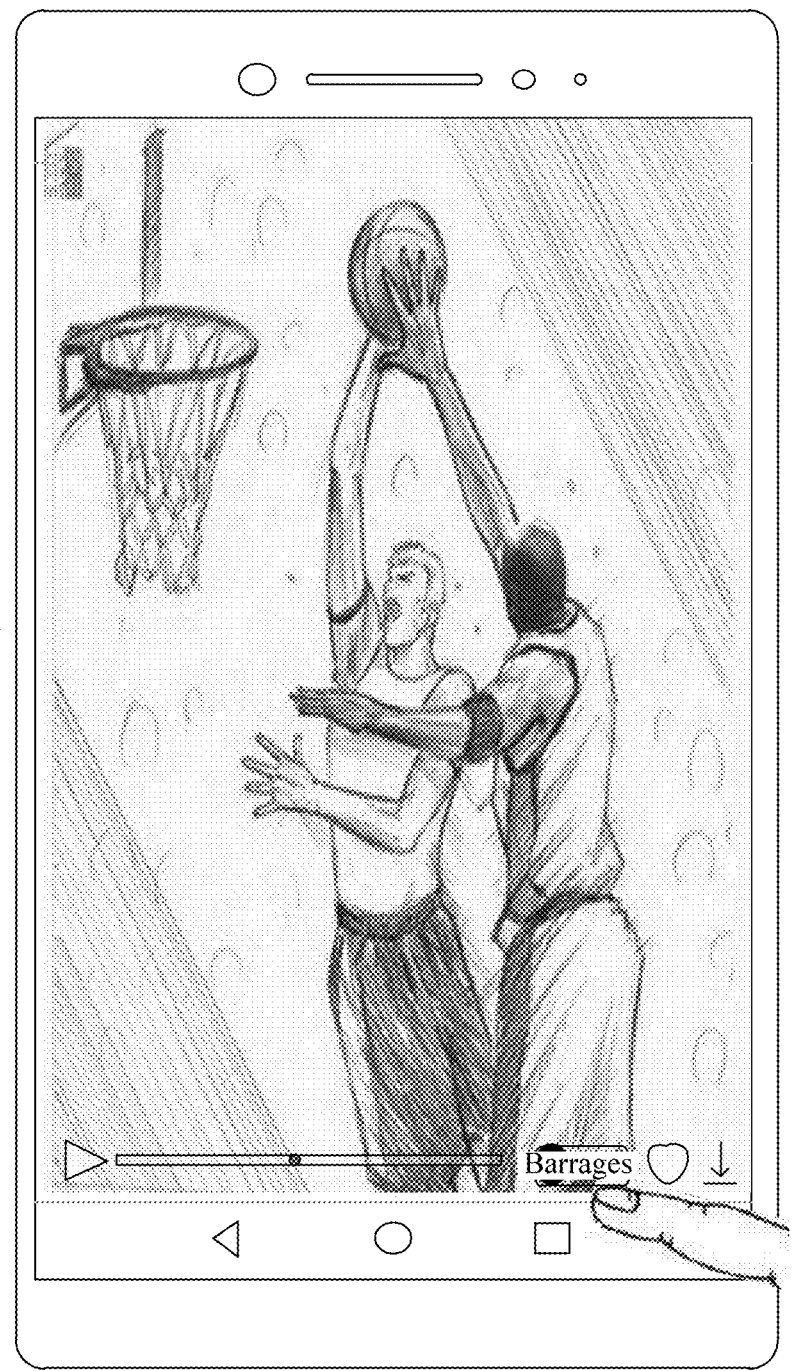
Figure 11C:
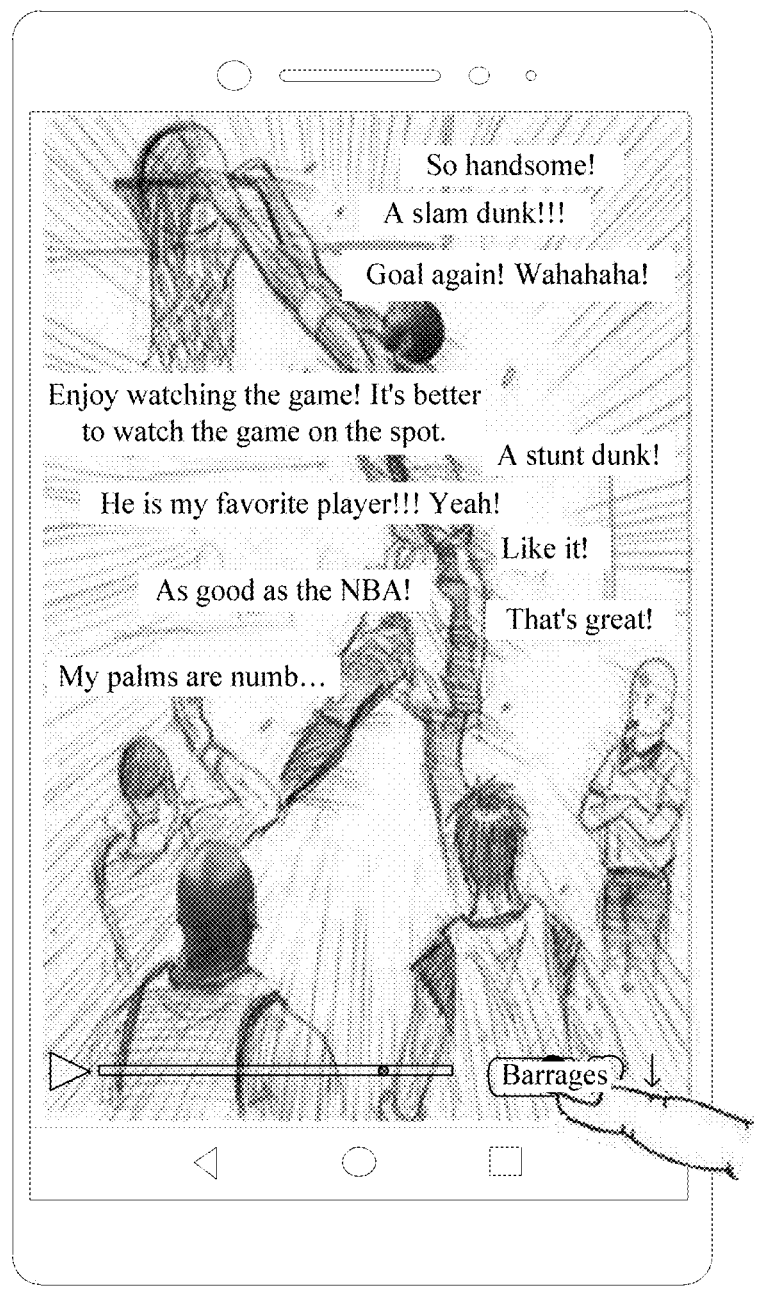

For example, referring to FIG. 11, in a process of playing a video in a video player, if barrages cannot be displayed when the user view the barrages, the user may temporarily turn off a button used to view the barrages. After watching the video for a while, the user may normally view the barrages. This is because when the user does not view the barrages within a short period of time, the mobile phone may unload a class corresponding to viewing the barrages and load a fixed class, so that in a case in which the user is unaware, the problem of unable to view the barrages is quickly fixed.

Similar to the scenario described in the foregoing step 301, step 303, and step 304, in a scenario described in the foregoing step 302, step 303, and step 304, the mobile phone may attempt to unload the first class when the updated second class corresponding to the first class is detected. After the first class is successfully unloaded, the second class obtained after the first class is updated is loaded in the operation process of the application. When creating the second class object corresponding to the second class, the mobile phone stores the reference relationship of the second class object or the reference relationship and the dependency relationship of the first class object into the reference mapping table, so that hot replacement of code is implemented in a quick and accurate manner in the operation process of the application, and a function of the first class in the operation process of the application is updated. The second class and the first class may have a preset association relationship, to help the mobile phone detect the corresponding second class based on the first class. For example, the second class and the first class may have a same identifier but different storage locations.

In the scenario described in the foregoing step 302, step 303, and step 304, the mobile phone may periodically obtain a plurality of updated classes from a server or receive a plurality of updated classes pushed by a server, where the plurality of updated classes may include the second class obtained after the first class is updated.

When a class in the application needs to be updated, in this embodiment of this application, the second class is obtained from the server and the first class is replaced with the second class, so that the first class can be updated. Because the class has a small amount of code, compared with updating the class by using an update package having a large amount of code, less traffic is required to obtain the second class, a speed is faster, and processing efficiency of replacing the first class with the second class is also higher.

In a possible scenario, the mobile phone operates the application by using an apk. In the method provided in this embodiment of this application, when detecting that a class corresponding to a particular functional module in the application is of relatively low importance (for example, the class is no longer used, or the class is not used within a long period of time), the mobile phone can automatically unload the class, and release memory space occupied by the class, thereby increasing available memory space of the system and improving user experience.

When an urgent problem occurs in a particular functional module used by the user, a class corresponding to the module in which the problem occurs is dynamically unloaded, and the module can be automatically replaced in the background in a case in which the user does not restart the apk, thereby implementing hot fix when the user is unaware.

Figure 12:
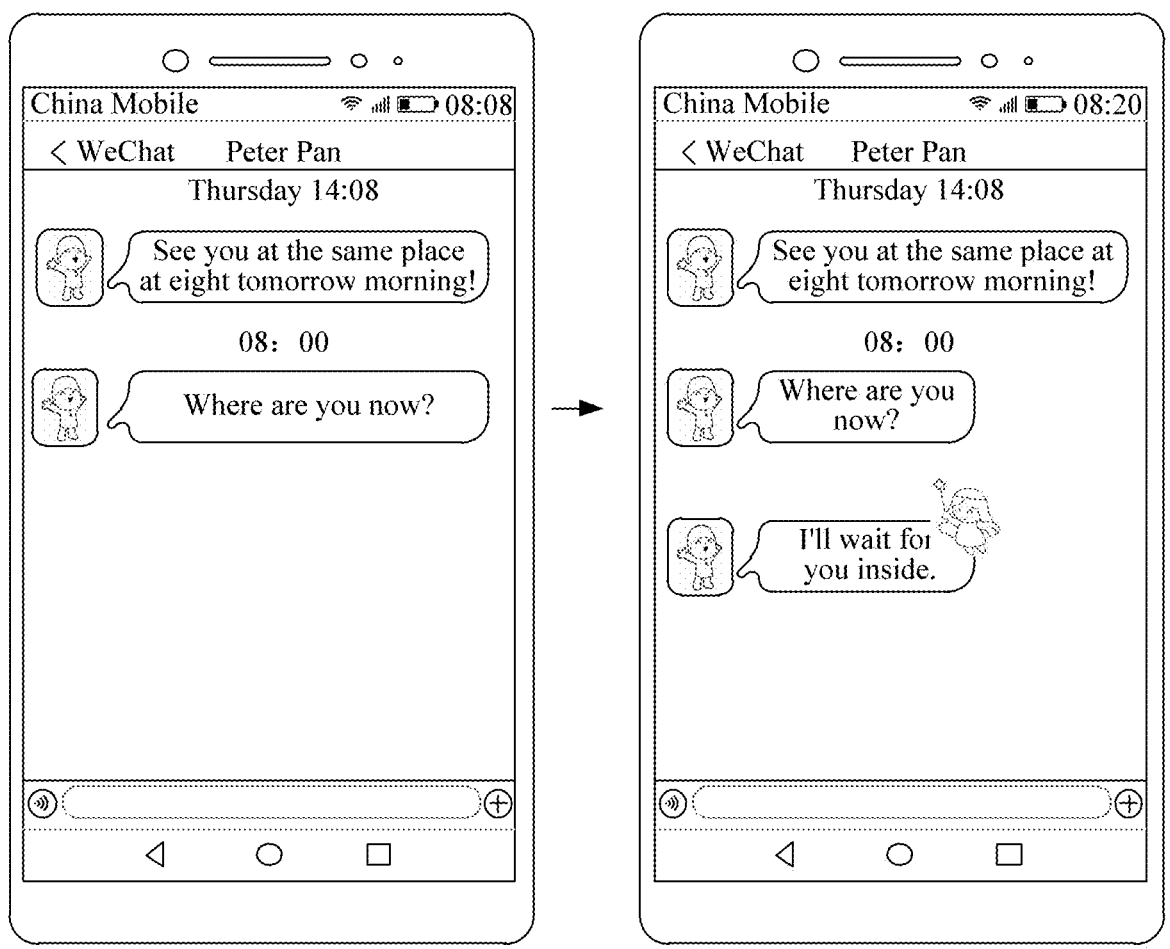
FIG. 12 is a schematic diagram of another scenario according to an embodiment of this application.

For example, referring to FIG. 12, in the operation process of WeChat, when receiving a message again in the chat interface after a time interval, the user finds that there is a little-angel identifier beside a message content box, thereby improving user experience. This may be because the mobile phone updates a class for displaying message content within a time interval in which the user does not receive the message.

In addition, in this embodiment of this application, after the application is closed, the mobile phone may further unload all the classes corresponding to the application.

It may be understood that, to implement the foregoing functions, the electronic device includes corresponding hardware structures and/or software modules for performing the functions. A person of ordinary skill in the art should be easily aware that, in combination with algorithms steps of the examples described in the embodiments disclosed in this specification, this application may be implemented in a form of hardware or a combination of hardware and computer software. Whether a function is performed by hardware or hardware driven by the computer software depends on particular applications and design constraints of the technical solutions. A person skilled in the art may use different methods to implement the described functions for each particular application, but it should not be considered that the implementation goes beyond the scope of this application.

In the embodiments of this application, functional modules in the electronic device may be divided according to the foregoing method example. For example, the functional modules may be divided based on the functions. Alternatively, two or more functions may be integrated into a processing module. The foregoing integrated module may be implemented in a form of hardware, or may be implemented in a form of a software functional module. It should be noted that, in the embodiments of this application, module division is an example, and is merely a logical function division. In an actual implementation, another division manner may be used.

Figure 13:
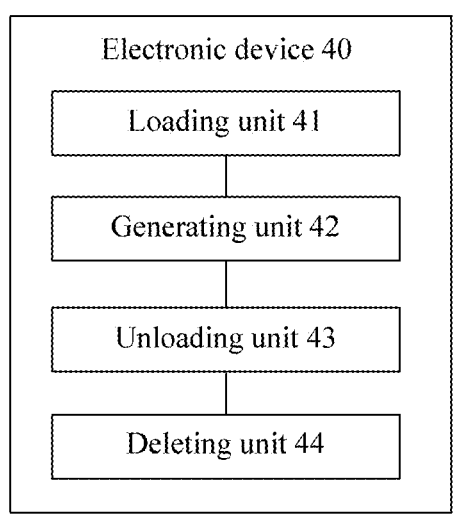
FIG. 13 is a schematic structural diagram of an electronic device according to an embodiment of this application.

In a case in which the functional modules are divided based on the corresponding functions, FIG. 13 shows a possible schematic composition diagram of an electronic device 40 in the foregoing embodiments. As shown in FIG. 13, the electronic device 40 may include a loading unit 41, a generating unit 42, and an unloading unit 43. The loading unit 41 may be configured to load n classes after an application is started, where n is a positive integer. The generating unit 42 may be configured to generate a reference mapping table, where the reference mapping table includes a reference relationship between the n classes and m class objects corresponding to the n classes and a dependency relationship between the m class objects corresponding to the n classes, the dependency relationship is used to represent an interdependency mapping relationship between different class objects, and m is a positive integer greater than or equal to n. The unloading unit 43 may be configured to unload a first class of the n classes based on the reference mapping table in an operation process of the application.

Further, the electronic device 40 may further include a deleting unit 44. The deleting unit 44 may be configured to support the electronic device 40 in performing step 204 and step 211 in the foregoing method embodiments.

In addition, the loading unit 41 may further be configured to support the electronic device 40 in performing step 303 and step 304 in the foregoing method embodiments. The unloading unit 43 may further be configured to support the electronic device 40 in performing step 205, step 206, step 207, step 208, step 209, step 210, step 301, and step 302 in the foregoing method embodiments. The loading unit 41, the generating unit 42, the unloading unit 43, and the deleting unit 44 may further be configured to perform another process of the technology described in this specification.

It should be noted that, all related content of each step in the foregoing method embodiments may be cited in a function description of a corresponding functional module. Details are not described herein again.

Certainly, the electronic device includes but is not limited to the unit modules enumerated above. For example, the electronic device may further include a storage unit. The storage unit is configured to store program code and related data of the electronic device, such as an index of a presentation segment and an association relationship of an identifier of a function. The electronic device may further include a communications unit. The communications unit may include a sending unit configured to send data or a signal to another device, a receiving unit configured to receive data or a signal sent by the another device, and the like. In addition, specific functions that can be implemented by the foregoing functional units include, but are not limited to, the functions corresponding to the method steps in the foregoing examples. For detailed descriptions of another unit of the electronic device, refer to detailed descriptions of method steps corresponding to the unit. Details are not described herein again in this embodiment of this application.

The loading unit 41, the generating unit 42, the unloading unit 43, and the deleting unit 44 in FIG. 13 may be a processor or a controller, for example, may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The storage unit may be a memory. The communications unit may be a transceiver, an RF circuit, a communications interface, or the like.

When the loading unit 41, the generating unit 42, the unloading unit 43, and the deleting unit 44 in FIG. 13 are the processor, the communications module is the RF circuit, and the storage unit is the memory, the electronic device provided in this embodiment of this application may be the mobile phone shown in FIG. 3. The communications unit may further include a Wi-Fi module and a Bluetooth module.

The foregoing descriptions of the implementations allow a person skilled in the art to understand that, for the purpose of convenient and brief description, division of the foregoing functional modules is used as an example for illustration. In an actual application, the foregoing functions may be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in another manner. For example, the foregoing apparatus embodiment is merely an example. For example, the module or unit division is merely logical function division and may be another division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, that is, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

If the integrated unit is implemented in the form of the software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A class unloading method, comprising:
    loading n classes after an application is started, wherein n is a positive integer;
    generating a reference mapping table, wherein the reference mapping table comprises a reference relationship between the n classes and m class objects corresponding to the n classes and a dependency relationship between the m class objects corresponding to the n classes, the dependency relationship is used to represent an interdependency mapping relationship between different class objects, and m is a positive integer greater than or equal to n; and
    unloading a first class of the n classes based on the reference mapping table in an operation process of the application, wherein when the reference mapping table does not comprise reference relationships and dependency relationships of all class objects corresponding to the first class, unloading the first class comprises:
        deleting, from the reference mapping table, the reference relationships and the dependency relationships of all class objects corresponding to the first class when the reference mapping table meets a preset condition, wherein after the deleting the reference mapping table does not comprise any reference relationships or dependency relationships of class objects corresponding to the first class; and
        unloading the first class; and
    wherein the preset condition comprises: priorities of all class objects corresponding to the first class in the reference mapping table are less than or equal to a first preset threshold, and priorities of class objects on which all class objects corresponding to the first class in the reference mapping table depend are less than or equal to a second preset threshold.

2. The method according to claim 1, wherein before unloading the first class of the n classes based on the reference mapping table, the method further comprises:
    when a first class object of the m class objects is cleared from a memory, deleting a reference relationship of the first class object from the reference mapping table in response to the reference mapping table storing the reference relationship of the first class object; or
    deleting a reference relationship and a dependency relationship of the first class object from the reference mapping table in response to the reference mapping table storing the reference relationship and the dependency relationship of the first class object.

3. The method according to claim 1, wherein unloading the first class of the n classes based on the reference mapping table comprises:
    unloading the first class of the n classes based on the reference mapping table when there is an exception on the first class.

4. The method according to claim 1, wherein unloading the first class of the n classes based on the reference mapping table comprises:
    unloading the first class of the n classes based on the reference mapping table when an updated second class corresponding to the first class is detected.

5. The method according to claim 4, wherein after unloading the first class of the n classes based on the reference mapping table, the method further comprises:
    loading the updated second class; and
    storing a reference relationship of a second class object or the reference relationship and the dependency relationship of the first class object into the reference mapping table when creating a second class object corresponding to the updated second class.

6. The method according to claim 1, wherein when the reference mapping table meets the preset condition, the method further comprises:
    clearing, from a memory, all the class objects corresponding to the first class and the class objects on which all the class objects corresponding to the first class depend.

7. The method according to claim 1, wherein a priority of a third class object is higher than the first preset threshold when the third class object corresponding to the first class in the reference mapping table is operating in a foreground; or a priority of a class object on which the third class object depends is higher than the second preset threshold when the class object on which the third class object depends is operating in the foreground.

8. The method according to claim 1, wherein after generating the reference mapping table, the method further comprises:
    deleting the reference mapping table when the application is closed.

9. A non-transitory computer storage medium, comprising a computer instruction, wherein when the computer instruction is run on an electronic device, the electronic device is configured to perform the class unloading method according to claim 1.

10. An electronic device, comprising: one or more processors and one or more memories, wherein the one or more memories are coupled to the one or more processors, the one or more memories comprise computer program code, the computer program code comprises a computer instruction, and when the one or more processors execute the computer instruction, the electronic device performs:
    loading n classes after an application is started, wherein n is a positive integer;

generating a reference mapping table, wherein the reference mapping table comprises a reference relationship between the n classes and m class objects corresponding to the n classes and a dependency relationship between the m class objects corresponding to the n classes, the dependency relationship is used to represent an interdependency mapping relationship between different class objects, and m is a positive integer greater than or equal to n; and unloading a first class of the n classes based on the reference mapping table in an operation process of the application, wherein when the reference mapping table does not comprise reference relationships and dependency relationships of all class objects corresponding to the first class, unloading the first class comprises:

deleting, from the reference mapping table, reference relationships and dependency relationships of all class objects corresponding to the first class when the reference mapping table meets a preset condition, wherein after the deleting the reference mapping table does not comprise any reference relationships and dependency relationships of class objects corresponding to the first class; and unloading the first class; and wherein the preset condition comprises: priorities of all the class objects corresponding to the first class in the reference mapping table are less than or equal to a first preset threshold, and priorities of class objects on which all the class objects corresponding to the first class in the reference mapping table depend are less than or equal to a second preset threshold.

11. The electronic device according to claim 10, wherein the electronic device is a chip.

12. The electronic device according to claim 10, wherein when the one or more processors execute the computer instruction, the electronic device further performs:

before unloading the first class of the n classes based on the reference mapping table:

when a first class object of the m class objects is cleared from a memory, deleting a reference relationship of the first class object from the reference mapping table in response to the reference mapping table storing the reference relationship of the first class object; or deleting a reference relationship and a dependency relationship of the first class object from the reference mapping table in response to the reference mapping table storing the reference relationship and the dependency relationship of the first class object.

13. The electronic device according to claim 10, wherein unloading the first class of the n classes based on the reference mapping table comprises:

unloading the first class of the n classes based on the reference mapping table when there is an exception on the first class.

14. The electronic device according to claim 10, wherein unloading the first class of the n classes based on the reference mapping table comprises:

unloading the first class of the n classes based on the reference mapping table when an updated second class corresponding to the first class is detected.

15. The electronic device according to claim 14, wherein when the one or more processors execute the computer instruction, the electronic device performs:

after unloading the first class of the n classes based on the reference mapping table, loading the updated second class; and storing a reference relationship of a second class object or the reference relationship and the dependency relationship of the first class object into the reference mapping table when creating a second class object corresponding to the updated second class.

16. The electronic device according to claim 10, wherein when the one or more processors execute the computer instruction, the electronic device performs:

when the reference mapping table meets the preset condition, clearing, from the memory, all the class objects corresponding to the first class and the class objects on which all the class objects corresponding to the first class depend.

\* \* \* \* \*